(12) United States Patent
Lim

(10) Patent No.: US 7,170,980 B2
(45) Date of Patent: Jan. 30, 2007

(54) SYSTEM AND METHOD OF OPERATING TERMINAL IN AT LEAST TWO COMMUNICATION MODES

(75) Inventor: Jae Sang Lim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 10/359,594

(22) Filed: Feb. 7, 2003

(65) Prior Publication Data

US 2004/0017901 A1    Jan. 29, 2004

(30) Foreign Application Priority Data

Jul. 24, 2002    (KR)  ...................... 10-2002-0043659

(51) Int. Cl.
  *H04M 11/00*   (2006.01)
(52) U.S. Cl. ................. 379/93.07; 370/352; 379/90.01
(58) Field of Classification Search ............ 379/93.07, 379/93.09, 90.01, 93.05; 370/352
  See application file for complete search history.

(56) References Cited

U.S. PATENT DOCUMENTS

| | | | |
|---|---|---|---|
| 6,011,794 A * | 1/2000 | Mordowitz et al. ...... | 379/90.01 |
| 6,011,909 A * | 1/2000 | Newlin et al. ........... | 379/93.35 |
| 6,169,734 B1 | 1/2001 | Wilson | |
| 6,377,570 B1 * | 4/2002 | Vaziri et al. ................. | 370/352 |
| 6,700,956 B2 * | 3/2004 | Chang et al. ............ | 379/93.09 |
| 6,711,160 B2 * | 3/2004 | Chan et al. ............... | 379/93.07 |
| 2001/0046237 A1 * | 11/2001 | Chan et al. ................. | 370/352 |
| 2002/0089975 A1 | 7/2002 | Vaziri et al. | |
| 2003/0095542 A1 * | 5/2003 | Chang et al. ............... | 370/352 |
| 2003/0152066 A1 * | 8/2003 | Luciano, III ............... | 370/352 |
| 2003/0169860 A1 * | 9/2003 | Chou ......................... | 370/352 |

FOREIGN PATENT DOCUMENTS

| | | |
|---|---|---|
| JP | 11-331271 | 11/1999 |
| JP | 11-355474 | 12/1999 |
| JP | 2001-203805 | 7/2001 |

OTHER PUBLICATIONS

Copy of Japanese Office Action dated Dec. 5, 2005 in counterpart Japanese application.
Office Action issued by Chinese Patent Office on Dec. 10, 2004.

* cited by examiner

*Primary Examiner*—Stella Woo
(74) *Attorney, Agent, or Firm*—Fleshner & Kim LLP.

(57) ABSTRACT

A communications terminal operates in multiple modes including a wired phone mode, an Internet phone mode, and a combined mode. The terminal includes a wired phone unit and an IP phone unit which separately processes calls to/from PSTN- and Internet-communications networks. The terminal also includes a processor which processes a call through a voice path which connects the wired phone unit and the IP phone unit in a third mode of operation which is referred to as an external connection mode. By processing a call along this path, the cost of performing long-distance and/or international calling may be substantially reduced and transmission efficiency may simultaneously be improved.

8 Claims, 7 Drawing Sheets

SYSTEM AND METHOD OF OPERATING TERMINAL IN AT LEAST TWO COMMUNICATION MODES

BACKGROUND OF THE INVENTION

1. Field of the Invention

The present invention relates to a communications system, and more particularly to a system and method for operating a terminal in at least two communication modes.

2. Background of the Related Art

A variety of ways may be used to call parties in remote areas. One way is to use wired phones connected to PSTN (Public Switched Telephone Network) and another way is to use VoIP (Voice Over Internet Protocol) phones connected to a network such as the Internet. Because in recent times the number of users of Internet services has increased and higher data-transmission-rates over the internet are now required, applications such as Internet phones, Internet faxes, and Internet broadcastings are in greater demand.

In the case of long distance and international calls especially, Internet phones have proven to have an advantage in terms of providing very cost-effective services compared with conventional wired-phones used over PSTN. As a result, many companies have turned their attention towards developing the Internet phone business. These companies include personal computer network business firms, Internet service providers, and telephone companies.

Conventional Internet phone service has at least one drawback. This service is not capable of placing calls without using personal computers having modems. For example, conventional Internet phones are only able to place calls using a deployed network located between PCs having built-in modems in which computer-to-telephone connections exist or between telephones having connections to computers. The dependency of conventional Internet phone service on the use of computer modems places a limitation on where this service may be used, i.e., this service may only be used in areas where computer modems are located. This results in low scalability of network systems.

In order to overcome this drawback and to promote anytime/anywhere phone service at low cost, next-generation Internet phones should be introduced with high data rate capabilities. These phones should also be able to simultaneously access both PSTN networks and Internet, which is desirable for the scalabilities over the current deployed network systems. The simultaneous access of these networks has not previously been contemplated and therefore a need exists for such a system, method, and terminal which operates in this manner.

SUMMARY OF THE INVENTION

An object of the invention is to solve at least the above problems and/or disadvantages and to provide at least the advantages described hereinafter.

Another object of the present invention is to provide a dual IP phone and a method of using this phone that substantially obviates one or more drawbacks of conventional communications systems and methods.

Another object of the present invention is to provide an IP phone which operates in at least two communications modes.

Another object of the present invention is to provide an IP phone which simultaneously accesses a wide area network such as the Internet and a PSTN, and more specifically which processes a single call through a voice path which connects a PSTN and the Internet.

Another object of the present invention is to provide an IP phone of the aforementioned type which processes a second call through at least one of the PSTN and the Internet at the same time the first call is being processes through the voice path connecting the PSTN and Internet.

Another object of the present invention is to provide an IP phone which operates in at least two communications modes, which dual IP phone accesses a called party based on an external connection request.

These and other objects and other advantages of the present invention are achieved by providing a dual IP phone which includes wired phone, an Internet phone including a microphone that distinguishes one of a wired mode, an Internet mode, and an external connection mode, controls connectivity of the wired phone and the internet phone based on the distinguished mode, and controls to switch a path of voice signals of the dual IP phone.

The present invention is also a method for providing call services using a phone which operates in two modes. In the first mode the phone operates as an IP phone, and in the second mode the phone operates as a wired phone. This method further includes selecting one of wired mode, Internet mode, and external connection mode, making automatic connection with the Internet phone and the wired phone in the external connection mode, if any user requests an external connection with an external called party, receiving information regarding the called party and a password from the user, confirming whether the user is authenticated by checking the password, confirming an IP address of the called party by analyzing information, and connecting the user and the called party by transmitting an external call to the IP address.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
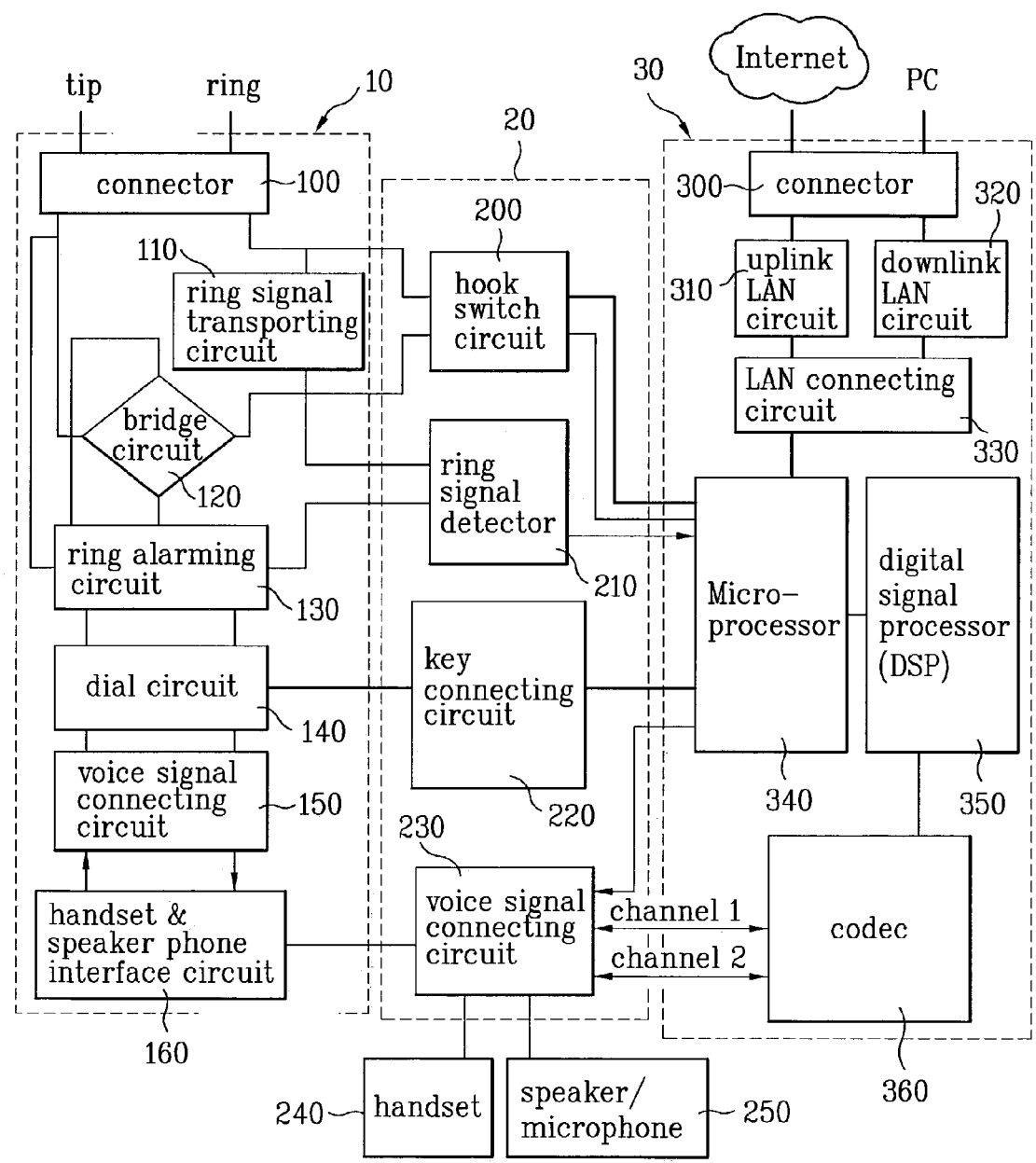
FIG. 1 illustrates a circuit diagram of an IP phone according to the present invention.

FIG. 1 is a diagram of a phone according to one embodiment of the present invention. This phone includes a PSTN (Public Switched Telephone Network) phone unit 10, an IP (Internet Protocol) phone unit 30, and a connecting circuit 20 for connecting the PSTN phone unit and the IP phone unit. The phone also includes or is interfaced to a handset 240 and/or a speaker/microphone 250. The handset and speaker/microphone are connected to the PSTN phone unit and the IP phone unit.

The PSTN phone unit includes a first connector 100 for establishing a physical connection between the PSTN phone and a PSTN, a ring signal transporting circuit 110 for transporting ring signals input from the first connector to a ring alarming circuit 130 (for example, by way of diode 211 in FIG. 3), and a bridge circuit 120 for operating the PSTN phone regardless of polarities of a supplied voltage source. The ring alarming circuit 130 activates an alarm (e.g., a bell) based on ring signals transported from the ring signal transporting circuit 110. In addition, the PSTN phone includes a dial circuit 140 for generating dial tones for transporting button signals input via a key connecting circuit 220 to PSTN, and a voice signal connecting circuit 150 which switches between two-line and four-line connections in order to provide voice signals to handset and speaker phone interface circuit 160. The voice signals are then provided to voice signal connecting circuit 230. The PSTN phone unit may operate without a supply of utility voltage and an RJ11 may be used for the first connector.

The connecting circuit 20 includes a hook switch circuit 200 having a plurality of relays and switches for switching between the PSTN phone unit 10 and the IP phone unit 30. The mode switch circuit switches, for example, an operating mode of the phone to at least one of PSTN mode, IP phone mode, and an external connection mode based on an external control signal. The connecting circuit further includes a ring signal detector 210, a key connecting circuit 220, and a voice signal connecting circuit 230. The ring signal detector 210 detects ring signals by monitoring a signal path connection between the ring alarming circuit 130 and the ring signal transporting circuit 110. (This signal path may be monitored using, for example, the circuit shown in FIG. 3 which is described in greater in the discussion which follows.) The key connecting circuit 220 converts button signals input by a user into signals that can be recognized by microprocessor 340. The voice signal connecting circuit 230 includes a plurality of switches which are arranged based on the operational mode of the system and in order to connect the handset and speaker phone circuit 160 over a first or second channel of a codec (coder/decoder) 360.

The IP phone unit includes a second connector 300 having a plurality of ports for establishing physical connections between the IP phone unit 30 and the Internet and/or one or more computers. An uplink LAN circuit 310 connects to the Internet via the second connector 300 and a downlink LAN circuit 320 connects to the computer via the second connector 300. A LAN circuit connecting circuit 330 establishes multiple connections and performs signal exchanges between the LAN circuits 310 and 320.

The IP phone unit further includes a microprocessor 340 and a digital signal processor (DSP) 350. The microprocessor performs multiple functions including analyzing signals input from the key connecting circuit 220, confirming a operating mode of the phone as corresponding to at least one of a PSTN mode, an IP mode, and an external connection mode, controlling the hook switch circuit 200 according to the confirmed operating mode, and switching the voice signal connecting circuit 230 to the codec 360 via the first (Channel 1) or second (Channel 2) channel of the codec.

The digital signal processor provides dial signals, generated according to a control signal of the microprocessor 340 in external connection mode, to an external calling party requesting the external connection mode via the second channel of codec. The DSP also provides converted signals of dial signals from the external calling party.

The codec 360 converts pulse code modulation (PCM) data input from the DSP into voice data in IP mode, converts voice data input from the voice signal connecting circuit 230 via the first channel to PCM data, and also converts voice signals input from the voice signal connecting circuit 230 into PCM data to be provided to the DSP 350 in external connection mode. An RJ 45 may be used for the second connector 300. While the codec has been described as converting PCM data into voice data, those skilled in the art can appreciate that the IP phone of the present invention can convert voice signal data using other types of modulation techniques.

Figure 2:
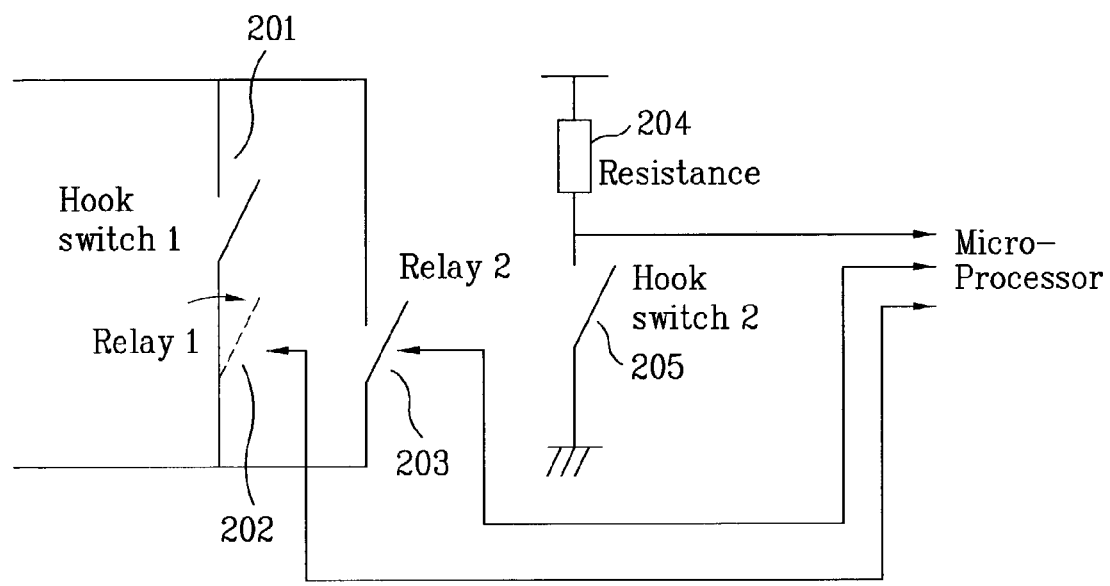
FIG. 2 illustrates a detailed diagram of hook switches according to the present invention.

FIG. 2 is a diagram showing an exemplary hook switch circuit which may be used in accordance with the present invention. In this diagram, hook switch 1 closes to establish a first connection 201 when handset 240 is picked up in PSTN mode. In IP mode, the microprocessor 340 in the IP phone unit turns off relay 1 (202) so that the IP phone unit 30 will not operate in PSTN mode when a user picks up the handset. In external connection mode, the microprocessor 340 turns on a relay 2 (203) of the hook switch circuit when ring signals are input from an outside source, so that the external calling party is automatically connected with an external called party via the dual-mode phone. Here, it is understood that the external called party has an IP address.

Figure 3:
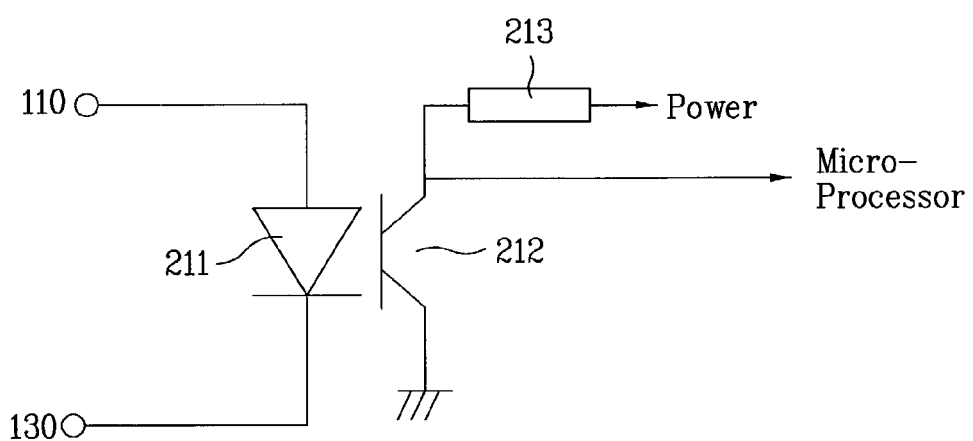
FIG. 3 illustrates a detailed diagram of ring signal detector according to the present invention.

FIG. 3 is a diagram showing a ring signal detector 210 which may be used in accordance with the present invention. The ring signal detector includes a diode 211 which inputs signals from the ring transporting circuit 110 and the ring alarming circuit 130, a photo coupler 212 for detecting whether signals are input into the diode 211 and for outputting the detected result to the microprocessor 340, a load resistor 213 and a power source for supplying a power to the photo coupler 212. The microprocessor 340 recognizes, based on the detected result of the photo coupler 212, that the PSTN phone unit 10 has received an external destination call for the external connection request. It also can recognize whether the destination call is based on a PSTN mode or an external connection mode. For instance, if the external origination call is based on external connection mode, the microprocessor makes the DSP 350 generate dial signals. The dial signals are then provided to the external calling party who requested the external connection mode via the second channel of the codec 360.

Figure 4A:
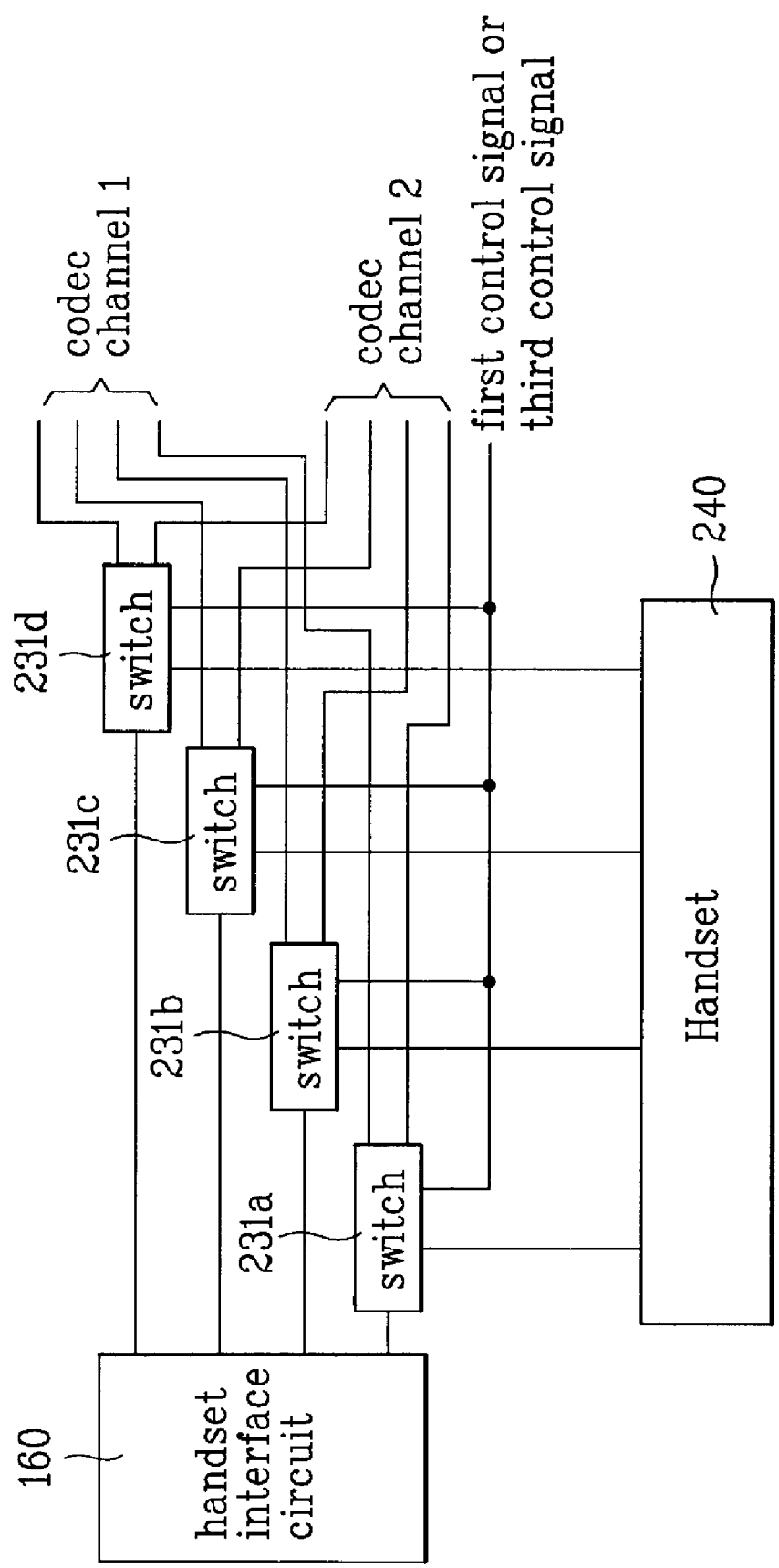
FIG. 4 illustrates a detailed diagram of a voice signal connecting circuit according to the present invention.
Figure 4B:
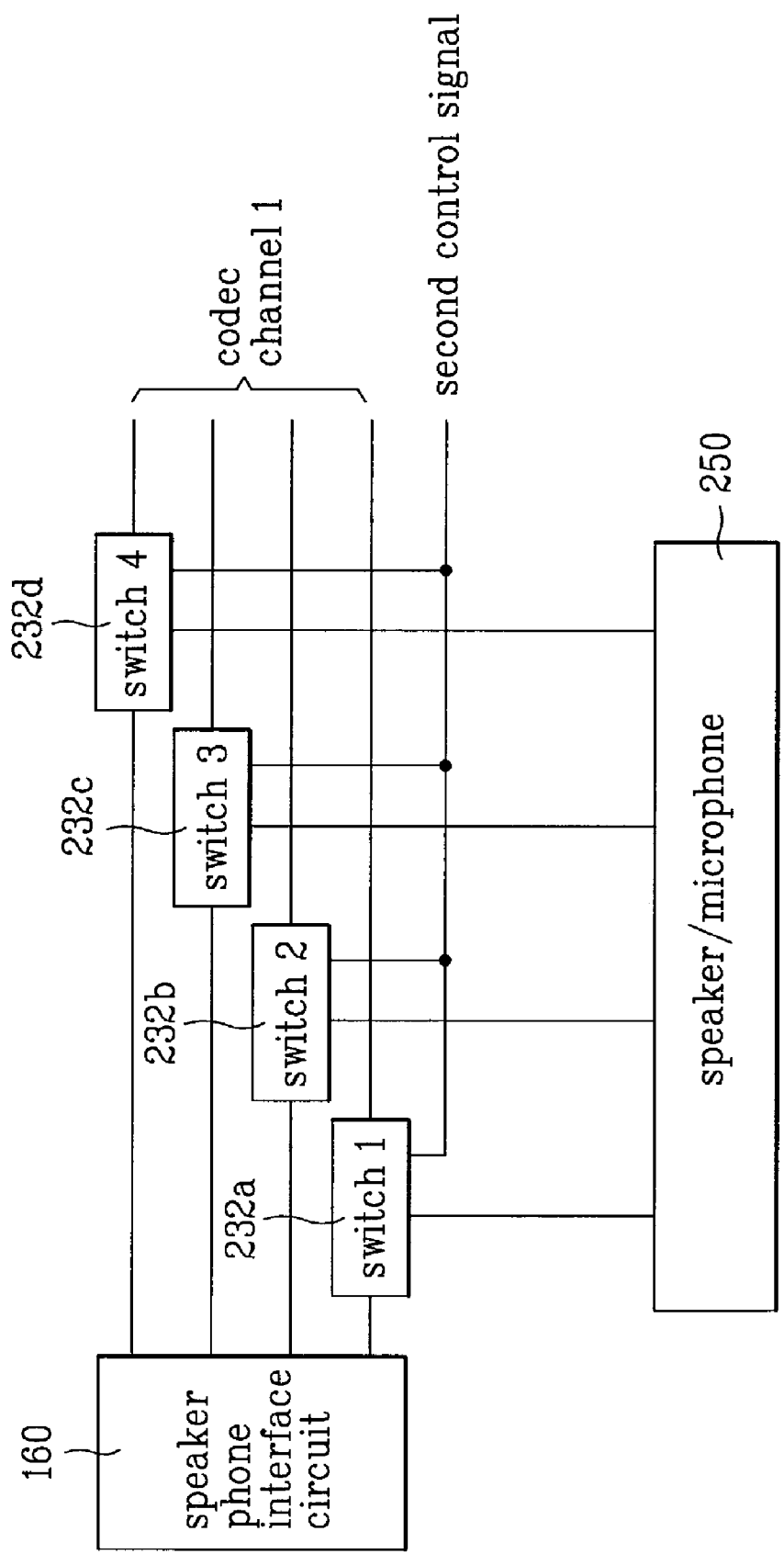

FIGS. 4A and 4B show voice signal connecting circuits which may be used in accordance with the present invention. Referring to FIG. 4A, when a user picks up a handset to make a call in PSTN mode and IP mode, the microprocessor provides a first control signal to the voice signal connecting circuit 230 in order to establish a connection between the handset 240 and either the handset interface circuit 160 or the codec 360 via the first channel. Referring to FIG. 4B, when a user pushes a speaker phone button in PSTN or IP mode, the microprocessor provides a second control signal to the voice signal connecting circuit 230 in order to establish a connection between the speaker/microphone 250 and either the speaker phone interface circuit 160 or the codec 360 via the first channel. Switches of FIGS. 4A and 4B are switched to corresponding devices according to the first control signal or the second control signal.

In external connection mode, the microprocessor provides a third control signal to the voice signal connecting circuit 230 in order to establish a connection with the handset interface circuit 160 and the codec 360 via the second channel. Also, the first control signal or the second control signal may be provided to the voice signal connecting circuit 230 in order to make a connection with either the handset 240 or speaker/microphone 250 and the codec 360 via the first channel. The external origination call is converted into PCM data after the switches of FIG. 4A are switched to corresponding devices according to the third control signal.

Figure 5A:
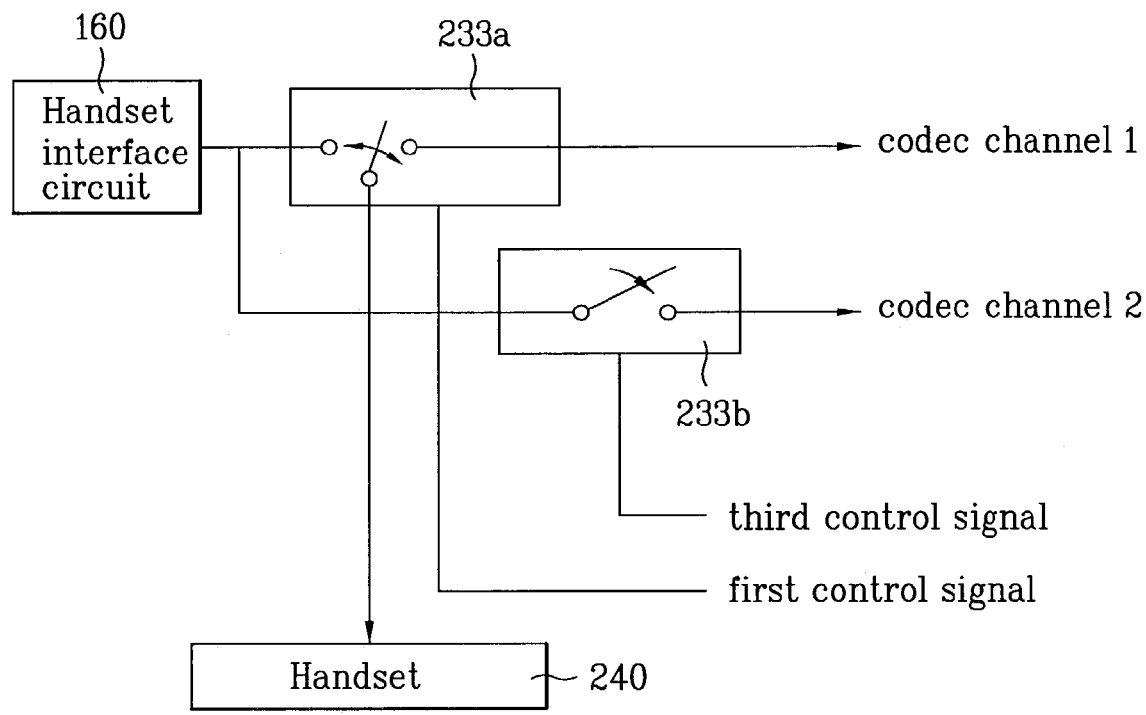
FIG. 5 illustrates detailed diagrams of switches as shown FIG. 4.
Figure 5B:
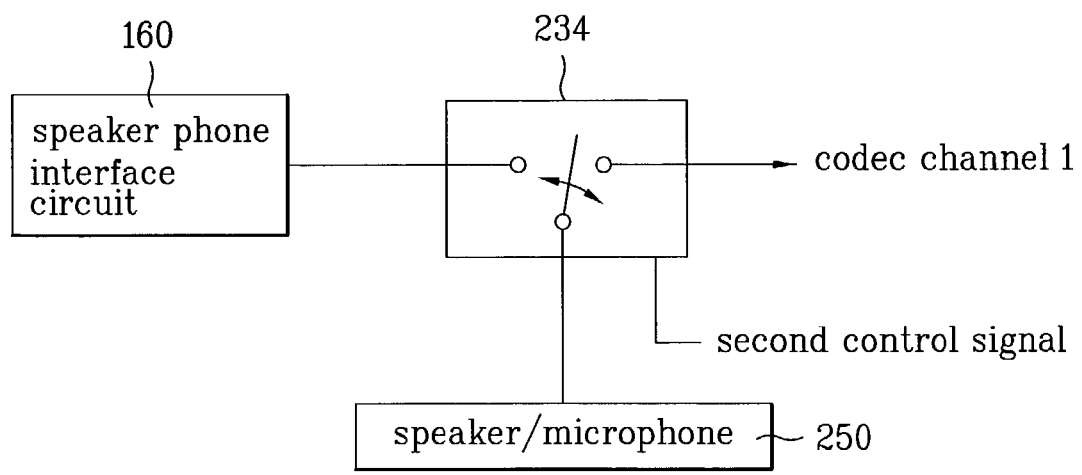

FIGS. 5A and 5B are more detailed diagrams of the switches shown in FIGS. 4A and 4B respectively. Referring to FIG. 5A, if a user picks up handset 240 in PSTN or IP mode, the first switch 233a is switched by the first control signal to connect the handset 240 with either the codec 360 via the first channel or handset interface circuit 160. In external connection mode, a second switch 233b is switched by the third control signal from the microprocessor to connect the handset interface circuit 160 with the codec 360 via the second channel.

Referring to FIG. 5B, if a user pushes a speaker phone button in PSTN or IP mode, the first switch 234 controlled by the second control signal is switched to connect the speaker/microphone 250 with the speaker phone interface circuit 160 or with the codec 360 via the first channel.

Figure 6:
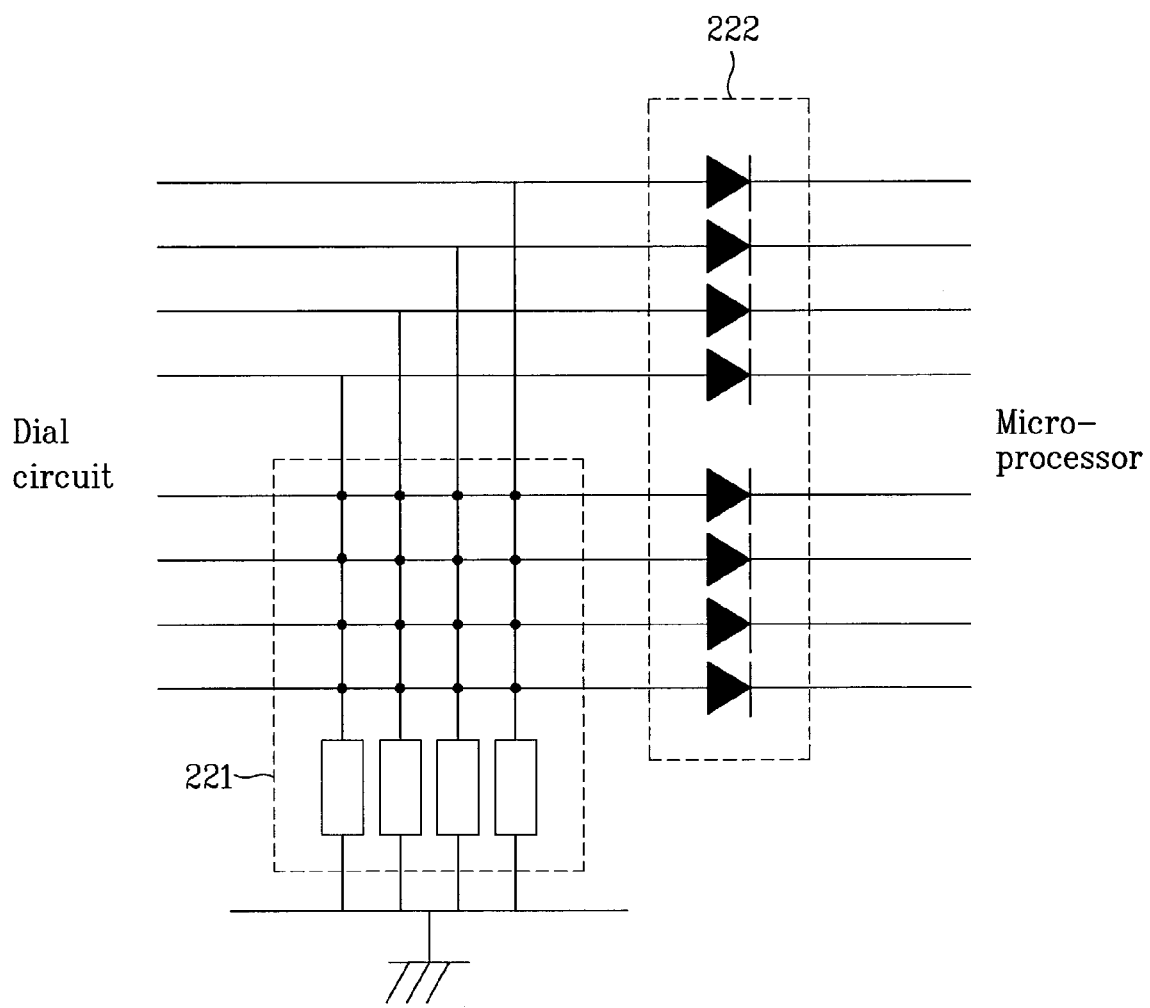
FIG. 6 illustrates a detailed diagram of key connecting circuit according to the present invention.

FIG. 6 shows an example of key connecting circuit 220 which may be used in accordance with the present invention. The key connecting circuit includes a detector 221 and a signal dividing circuit 222. The detector detects the numbers and/or selection buttons input by a user and provides the detected signals to the dial circuit 140 and the microprocessor. The signal dividing circuit electrically separates signals between the dial circuit and the microprocessor. Therefore, the dial circuit, in PSTN mode, generates a DTMF signal corresponding to the numbers input by a user and provides the signal to a called party. In addition, by monitoring signals provided by the key connecting circuit 220, the microprocessor may perform accurate operations in all modes described above.

Operation of the phone in accordance with a preferred embodiment of the present invention will now be described. According to a user's choice, the phone of the present invention may operate in one of three modes: PSTN mode, IP mode, and external connection mode. The PSTN and IP modes may be switched between one another by pushing a function button. In these two modes, the phone may receive calls originating from other PSTN phones or IP phones respectively. If calls originating from a PSTN phone and an IP phone are received simultaneously, the phone informs the user and the user then selects one of the calls to establish communications with a user of the selected call.

In selecting PSTN mode, the microprocessor 340 turns on a first relay 202 of the hook switch circuit. The first relay 202 may be turned on even without a power source. Then, the microprocessor provides the first control signal or the second control signal to the voice signal connecting circuit 230 in order to connect the handset and speaker phone interface circuit 160, according to the user's choice, with either the handset 240 or speaker/microphone 250. The voice signal connecting circuit 230 turns on a first switch 231 for the handset 240, or a second switch for the speaker/microphone according to the first control signal or the second control signal. When the PSTN phone unit 10, in PSTN mode, receives a call from the outside, a corresponding operation is performed respectively by the ring signal transporting circuit 110, the ring alarming circuit 130, the dial circuit 140, the voice signal connecting circuit 150, the handset and speaker phone interface circuit 160.

In IP mode, the microprocessor turns off the first relay 202 of the hook switch circuit (FIG. 2), and then the microprocessor provides the first control signal or the second control signal to the voice signal connecting circuit 230 in order to connect either the handset 240 or speaker/microphone 250 with the codec 360 via the first channel according to the user's choice. The voice signal connecting circuit 230 controls a first switch 231 for the handset 240, or a second switch for the speaker/microphone 250 is turned on according to the first control signal or the second control signal.

In external connection mode, the microprocessor 340 provides the third control signal to the voice signal connecting circuit 230. The voice signal connecting circuit is connected with the handset and speaker phone interface circuit 160 and the codec 360 via the second channel. If the microprocessor recognizes that a ring signal is detected by the ring signal detector 210, it controls the second relay 203 (FIG. 2) to be turned on in order for a caller of the external ring signal to establish communications with an external called party.

Figure 7:
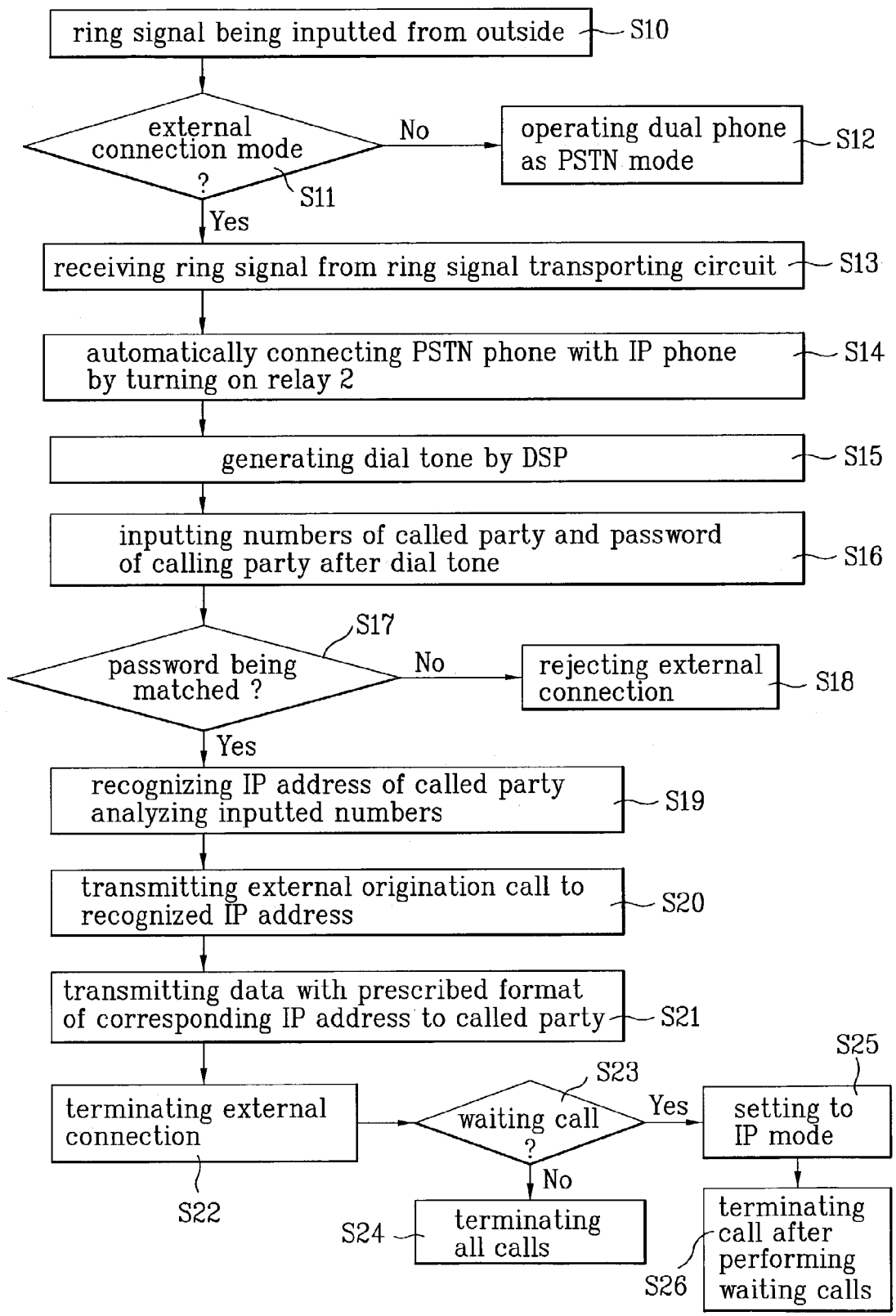
FIG. 7 illustrates a flow chart of making a communication by using the dual IP phone in accordance with the preferred embodiments of the present invention.

FIG. 7 is a flow chart showing a method for communicating in multiple modes of operation using the phone of the present invention. If the PSTN phone unit receives a ring signal from outside (S10), the microprocessor checks whether the phone system is set to an external connecting mode or not (S11). If the dual IP phone is not set to the external connection mode and the dual IP phone is not in use, the microprocessor controls the dual IP phone to be set in PSTN mode and then activates an alarm (e.g., a bell) in PSTN mode (S12). That is, the microprocessor controls the phone to be operated in PSTN mode.

If the phone is set to external connection mode and the system is not in use, the microprocessor turns on the second relay 203 of the hook switch circuit 200. The external connection requester is then automatically connected with the PSTN phone unit (S14). At this time, the IP phone unit 30 is also automatically connected with the PSTN phone unit 10. If the PSTN phone unit receives an external origination call for the external connection request from outside, the microprocessor recognizes through the ring signal transporting circuit 110 that the origination call for the external connection request is received by the PSTN phone unit and activates an alarm using ring alarming circuit 130 for a predetermined time period according the origination call. Thereafter, the microprocessor controls the digital signal processor (DSP) 350 to generate dial tones (S15).

The generated dial tones are converted to an analog dial signal. Then, the analog dial signal is provided to the external calling party who requested the external connection. The external calling party, when he/she hears the dial signal, starts to input the numbers he/she wishes to call and a password (S16). The dial signal is inputted to the microprocessor through the voice signal connecting circuit 230 and the codec 360 which is connected with the circuit 230 via the second channel. The DSP 350 analyzes the inputted numbers and provides a result of the analysis to the microprocessor.

The microprocessor determines whether the password matches a previously set one (S17) or not. If the password does not match, the microprocessor 340 rejects the external connection request (S18). If the password is matched, the microprocessor identifies an IP address of an external called party for the external connection request (S19). The microprocessor provides the IP address to the LAN circuit connecting circuit 330, which makes a connection of the external calling party and the external called party over an Internet using the IP address of the external calling party (S20). The LAN circuit connecting circuit 330 accesses the Internet through the uplink LAN circuit 310.

As previously indicated, if desired, two modes of operation may be simultaneously selected by a user. For example, both the Internet mode and external selection mode may be activated. When this occurs, the Internet phone unit is connected with the handset or speaker phone via the first channel and also the Internet phone unit is connected to the wired phone unit via the second channel.

Based on the connections, voice signals from the external calling party are inputted to the codec 360 through a voice signal connecting circuit 150 and voice signal connecting circuit 230. At this time, the voice signals are inputted to the codec 360 via the second channel. The codec converts the voice signals to PCM data and provides the PCM data to the DSP 350. The DSP again converts the PCM data into data of a standard format being able to exchange the PCM data with either the external called party or computer (S21). In addition, the DSP not only performs the conversion to data of the standard format but also compresses the PCM data or the data of the standard format.

The microprocessor provides data of the standard format to the IP address of the external called party, by using the uplink 310 and the LAN circuit connecting circuit 330. The microprocessor controls that a buffer (not shown) may store data to be transmitted to the IP address of the external called party for matching data transmission rate of the external called party with that of the dual phone. On the other hand, if the dual phone is set to the external connection mode, the IP phone unit is being used and the dual phone are operated as follows.

The microprocessor recognizes that the external calling party is attempting to establish a call with an external called party through the dual phone (PSTN phone unit 10 and IP phone unit 30) by the ring signal transporting circuit 110 (S13). It also turns on the relay 2 for automatically receiving signals from the external calling party, the external connection requester. The operation of receiving the signal is followed as S15–S22. At this time, a user of the dual phone may make conversations with two external IP users via an Internet.

If a conversation between the external calling party and external called party is terminated, the microprocessor 340 controls the dual phone set as previous mode Therefore, the user may perform a conversation for at least one waiting call.

In an alternative embodiment of the present invention, calls received in the IP phones are passed to the PSTN phone through the first channel. This embodiment therefore establishes a voice path in external connection mode which transmits a call in the reverse direction as previously described. Thus, in this embodiment, the microprocessor controls the hook switch and voice signal connecting circuits, among other elements of FIG. 1, so that packet data received by the Internet phone is converted into voice signals by the codec prior to being passed to the PSTN phone through channel 1.

The present invention is also a computer program including code which causes a processor to perform the steps of the method of the present invention. The program may be stored on a computer-readable medium which is either removably connected to the phone of the present invention or stored In a memory located within or connected to the processor.

A dual phone according to a preferable embodiment of the present invention connects PSTN and Internet. Since it also operates as external connection mode, an external calling party of may be connected with an external called party according to a request of the external calling party.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A phone, comprising:
   a wired phone unit which operates in a first communication mode;
   an Internet phone unit which operates in a second communication mode;
   a processor which establishes a voice signal path between the wired phone unit and the Internet phone unit and establishes a connection for an external connection request between an external calling party and an external called party via the voice signal path in a third communication mode when an external origination call for the external connection request is received from the external calling party;
   a first switching unit which switches between the Internet phone unit and the wired phone unit under control of the processor, wherein the first switching unit includes: a first switch connected to the wired phone unit in the first communication mode; a first relay for disconnecting the first switch in the second communication mode; and a second relay which connects the wired phone unit and the Internet phone unit under control the processor in order to establish a connection with an external called party when the external origination call is received from the external calling party; and
   a second switching unit which switches the voice signal path between the wired phone unit and the Internet phone unit under control of the processor, the second switching unit including
   a second switch for connecting the wired phone unit with a handset or speaker/microphone in the first communication mode;
   a third switch for connecting the Internet phone with a handset or speaker/microphone via a first channel in the second communication mode; and
   a fourth switch for connecting the wired phone unit with the Internet phone unit via a second channel in the third communication model, wherein the first channel and the second channel are paths for transporting voice signals to the Internet phone unit.

2. The phone of claim 1, wherein the third switch and the fourth switch are simultaneously turned on when both of the second communication mode and the third communication mode are selected.

3. The phone of claim 1, wherein the Internet phone unit includes:
   a converter which converts a voice signal into a digital signal, wherein the voice signal is input from at least one of the wired phone unit via the first channel and an external device via the second channel; and
   a digital signal processor which generates a dial tone in the third communication mode under control of the processor, provides the dial tone to the external calling party, and provides dial signals and the digital signal received from the external calling party to the processor.

4. The phone of claim 3, wherein the Internet phone unit further includes:
a plurality of local area network (LAN) devices having IP addresses, wherein one of the LAN devices is connected to a computer and another of the LAN devices is connected to the Internet, and wherein the processor establishes connections to corresponding users based on the IP addresses.

5. The phone of claim 1, wherein the processor is located in the Internet phone unit.

6. A method of processing calls within a phone which includes a wired phone unit and an Internet phone unit, comprising:
receiving an external origination call for an external connection request from an external calling party; and
establishing a voice path between the wired phone unit and the Internet phone unit, and establishing a connection for the external connection request between the external calling party and a called party via the voice path, said establishing further including:
connecting the wired phone unit with a handset or speaker/microphone in a first communication mode;
connecting the Internet phone with a handset or speaker/microphone via a first channel in the second communication mode; and
connecting the wired phone unit with the Internet phone unit via a second channel in the third communication mode, wherein the first channel and the second channel are paths for transporting voice signals to the Internet phone unit; said method further comprising:
receiving phone number of the called party from the external calling party which is authenticated; and
confirming an IP address of the called party based on phone number; and
connecting the external calling party and the called party by transmitting an external call to the IP address.

7. The method of claim 6, further comprising:
providing a dial tone to the called party according the Internet phone unit and the wired phone unit are connected; and
checking the password and information received from the external calling party after the dial tone.

8. The method of claim 6, wherein the Internet phone unit includes:
a converter which converts a voice signal into a digital signal, wherein the voice signal is input from at least one of the wired phone unit via the first channel and an external device via the second channel; and
a digital signal processor which generates a dial tone in the third communication mode under control of the processor, provides the dial tone to the external calling party, and provides dial signals and the digital signal received from the external calling party to the processor.

* * * * *